May 23, 1939. W. E. BUSH 2,159,253
TRAILER HITCH
Filed June 21, 1937 2 Sheets-Sheet 1
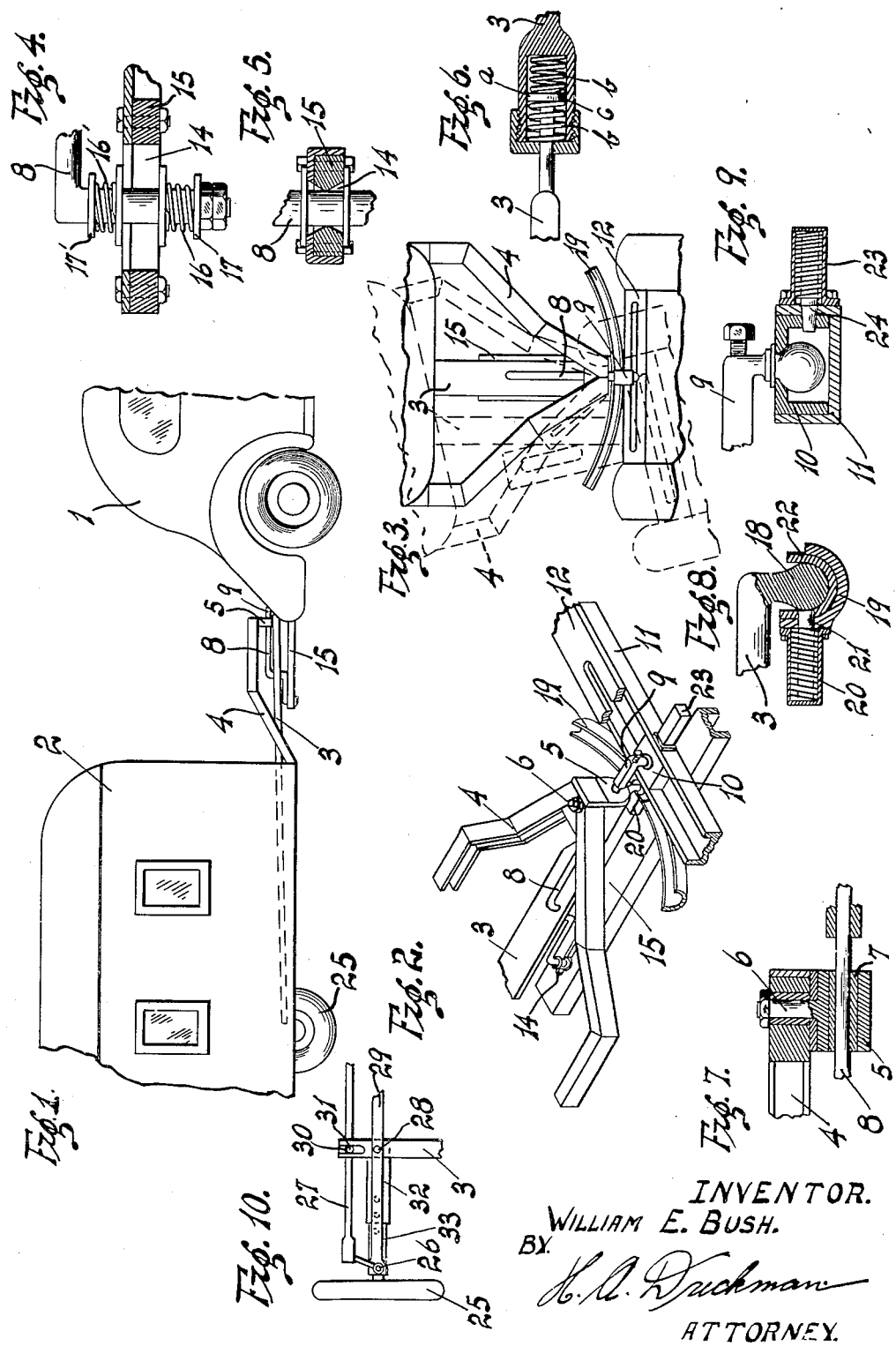
INVENTOR.
WILLIAM E. BUSH.
BY
ATTORNEY.

May 23, 1939.  W. E. BUSH  2,159,253
TRAILER HITCH
Filed June 21, 1937  2 Sheets-Sheet 2
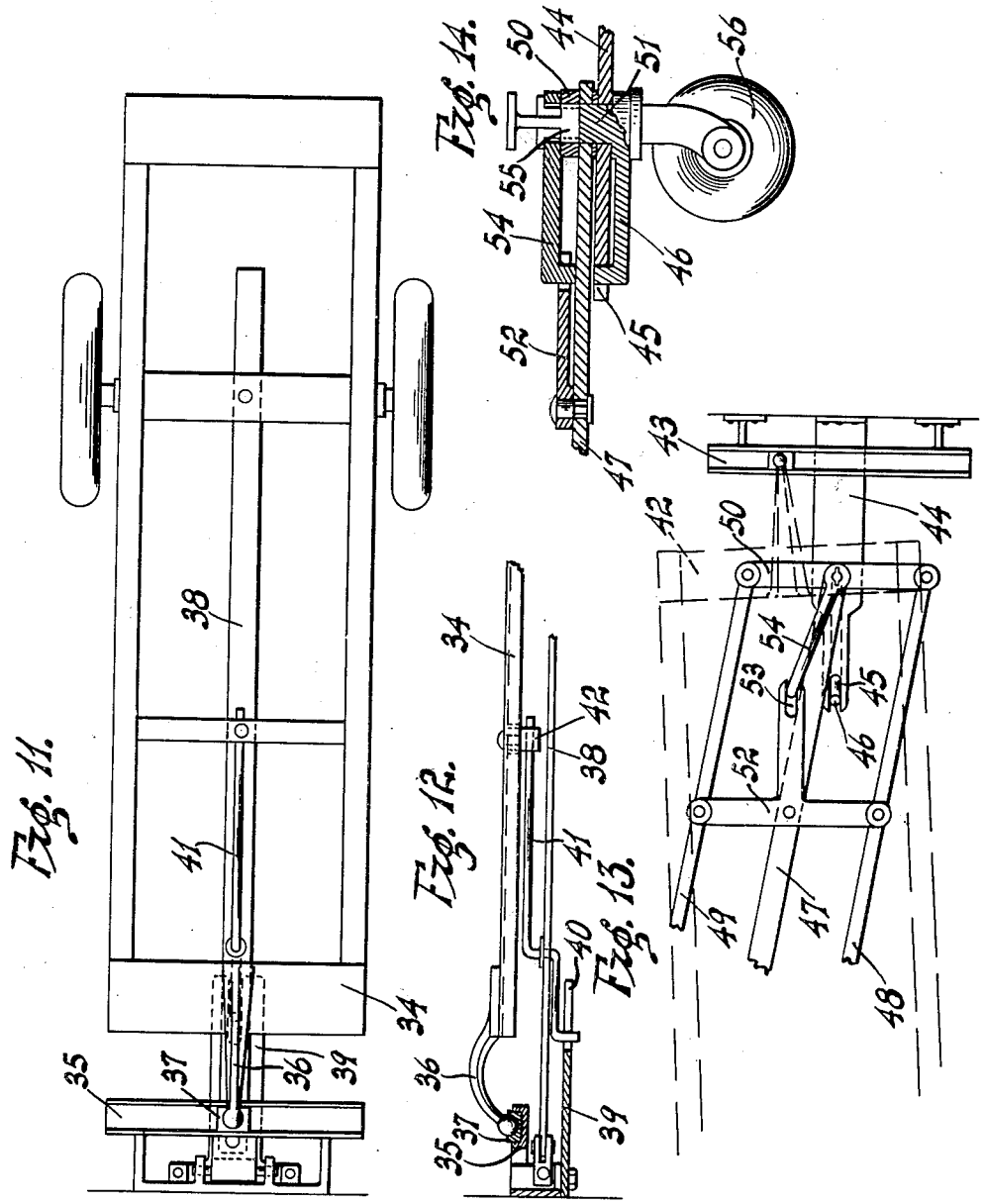
INVENTOR.
WILLIAM E. BUSH.
BY
ATTORNEY.

Patented May 23, 1939

2,159,253

UNITED STATES PATENT OFFICE 2,159,253

TRAILER HITCH

William E. Bush, Long Beach, Calif.

Application June 21, 1937, Serial No. 149,310

11 Claims. (Cl. 280—33.5)

This invention relates to trailer hitches and it has particular reference to a hitch for automobile trailers so constructed that the movements of the trailer may be controlled by the operator of any automobile to which the trailer is connected, in backing preparatory to parking.

The principal object of the invention is to provide a trailer hitch having connection with the tow bar of the trailer and designed to impart a lateral urge to the forward end of the trailer when the transporting vehicle is turned to right or left, thereby displacing the longitudinal axis of the trailer with respect to that of the vehicle and causing the trailer to travel in a predetermined path when backing in the act of parking.

With the foregoing object paramount, the invention has other and lesser objects to become manifest as the description proceeds, taken in connection with the accompanying drawings wherein:

Figure 1 is a fragmentary elevation of an automobile and trailer showing the hitch of the invention.

Figure 2 is a perspective detail view of the sliding yoke.

Figure 3 is a plan view of the hitch showing displaced position in dotted lines.

Figure 4 is a fragmentary detail view of the crank for controlling the movements of the yoke.

Figure 5 is a vertical section through Figure 4.

Figure 6 is a fragmentary detail view of a shock absorbing element for the tow bar.

Figure 7 is a fragmentary detail view of the sliding yoke connection.

Figure 8 is a fragmentary detail view of the tow bar connection to the automobile.

Figure 9 is a fragmentary transverse sectional view of the sliding yoke showing the solenoid control pin.

Figure 10 is a fragmentary plan view of the trailer wheel construction.

Figure 11 is a plan view of a slightly modified form of trailer hitch.

Figure 12 is a fragmentary longitudinal sectional view of the hitch shown in Figure 11.

Figure 13 is a fragmentary plan view of still another form of trailer hitch.

Figure 14 is an enlarged longitudinal sectional view of the link assembly shown in Figure 13.

Continuing now with a more detailed description of the drawings, reference is primarily made to Figure 1 in which 1 designates the automobile and 2 the trailer. Usually, trailers are connected to the automobile simply by means of a draw bar and bolt. The pivotal point of the trailer is thereby fixed and no control over the movements of the trailer from the driver's seat of the automobile is possible, and it is practically impossible to back the trailer with the conventional hitch.

Accordingly, the present invention provides a tow bar 3 which is connected at one end to a point beneath the trailer, probably the axle, depending upon the length of the trailer body. A yoke 4 has its arms rigidly secured to the lower forward end of the trailer while the V-shaped forward end thereof is provided with a pivotally mounted box 5 Figure 7, the box being connected to the yoke by means of a pin 6. A bushing 7 is arranged in box 5, through which slidably passes the forward end of a bent arm or crank rod 8.

The tow bar 3, in order to reduce shock in starting and stopping, is equipped with the shock absorbing element shown in Figure 6. This element cannot be seen in the perspective view Figure 2, since it is disposed below the channel 11. However, it is composed of a housing (a) containing opposing springs (b—b) bearing against both sides of a disc (c) carried on the end of bar 3. The forward end of rod 8 enters a squared sleeve 9, the latter being turned downward to enter an aperture in the block 10, mounted in the channel 11 (Fig. 2). The purpose of the squared sleeve 9 is to prevent the rod 8 from rotating, yet enabling it to slide in the sleeve and the movements of the yoke 4 make it necessary for shortening and elongation of the rod, since the latter must follow the channel 11, which has a slotted plate 12, secured to the top thereof. The downwardly turned end of the sleeve 9 is adapted to move in the slot of this plate as shown.

The rod 8 extends rearwardly and is turned downwardly to pass through an aperture in the tow bar 3, thence again rearwardly to a point where it is bent downwardly to enter a slot 14 in a bar 15, affixed to and extending rearwardly from the automobile 1. In Figures 4 and 5 is shown the rod 8 passing through slot 14. The slot is shaped in the manner shown to reduce friction as the rod moves back and forth in the slot and to insure a snug fit, springs 16 and 16' surround the rod and bear against either side of the bar 15 and washer 17—17' on the rod. A spring balance is thus obtained. The forward end of the tow bar 3 is bent downwardly and a ball 18 is formed thereon. This ball fits in an arcuate trackway 19, which is grooved to accurately fit the ball. The track 19, is fixedly mounted rearwardly of the channel 11 and serves to guide the tow bar as it is moved to either side of central position, as will be further described.

From the foregoing, it will be seen that the trailer is towed by bar 3 which has pivotal connection to the automobile by means of the ball 18 and track 19. As the automobile swings to the left, the rigid bar 15 beneath the assembly exerts a force on the crank end of the rod 8 at the point where the latter extends through the slot 14 of this bar. Since the rod 8 passes through the tow bar 3, this point affords an axis for the rod and the force applied to the lower end of the rod 8 causes its opposite end to become displaced in an opposite direction, thereby swinging the forward end of the yoke 4 to the left, due to the fact that the forward end of the rod 8 slidably passes through the rotatable box or bearing 5 carried by the yoke. The rod 8 is constrained at its forward end to move in the channel 11 and is necessarily extensible, which fact holds the yoke under control at all times and insures pre-determined movement of the trailer with respect to the automobile. Moreover, since there is more than one point of connection between the automobile and the trailer, danger of accidental disconnection between them is reduced to the minimum. A solenoid 20 is mounted on the track 19 and at the center thereof and this solenoid is provided with a core 21 which is adapted to enter a hole in the sleeve 22 of the ball 18. When the solenoid 20 is not energized, the core 21 will engage the ball sleeve thus holding the tow bar 3 in a central position relative to the track 19. The block 10 is free to move in the channel 11 as previously described and this arrangement is employed while the trailer is being backed. A second solenoid 23 is mounted centrally on the channel 11 and the pin 24 of this solenoid engages the block 10 as shown in Figure 9 for the purpose of holding this block against movement when the solenoid 23 is not energized. Under certain conditions of maneuvering or backing the trailer, it is desirable to hold the block 10 in its central position and permit the tow bar 3 to move from side to side in order that the trailer may be properly maneuvered into position. When the towing vehicle 1 moves forwardly, the parts will be aligned to the position shown in Figures 2 and 3. This centralization of the parts is automatically accomplished and consequently the solenoid 20 or 23 can be operated and the pins 21 or 24 will fall into position as previously described. When the towing vehicle is moving forwardly and especially where sharp curves are encountered, the block 10, is held in its central position by means of the core or pin 24 of the solenoid 23 and the tow bar 3 is permitted to move from side to side by releasing the core or pin 21 of the solenoid 20. This permits the towing vehicle to negotiate sharp curves without causing the trailer to cut a corner. When the trailer is backed the pin 21 of the solenoid 20 engages the sleeve 22, thus holding the ball 18 against movement and at the same time, the pin 24 of the solenoid 23 is withdrawn from the block 10, thus allowing the block to shift in its track.

On long trailers, it might be desirable to move the wheels 25 of the trailer at the same time that the trailer hitch operates. For this purpose, the wheels 25 are pivotally mounted on spindles 26 and are connected by a drag link 27. The draw bar 3 is pivotally mounted at 28 on the axle 29 and as the forward end of the draw bar swings, as previously described, it will pivot around 28, thus swinging the bifurcated end 30. A pin 31 slides in the bifurcation and this pin can be either attached to the link 27 or to a pivotally mounted plate 32, which is adjustably attached to a plate 33 secured to the spindle 26.

In Figure 11, the frame 34 of the trailer, is supported at its forward end in a channel 35 which channel is fixedly secured to the towing vehicle. A yoke 36 rests on a block 37, the block being slidable in the channel 35. A draw bar 38 is pivotally attached at the forward end to the towing vehicle and at the rear end to the axle of the trailer. A plate 39 is fixedly attached to the towing vehicle and the rear end is bifurcated as shown at 40.

A control rod 41 is pivotally mounted in the draw bar 38 and the forward end of said rod fits into the bifurcation 40. The rear end of the rod is slidably mounted in a block 42 which is attached to the frame 34 of the trailer. As the towing vehicle turns from side to side, the rod 41 will be swung, due to the movement of the plate 39. The rod 41 will then act upon the frame 34, causing the front end thereof to move in a manner previously described. In Figures 13 and 14, the frame 42 of the trailer is again slidably mounted in a channel 43, the same as described in Figures 11 and 12. A plate 44 is fixedly attached to the towing vehicle and the rear end of this plate is bifurcated as shown at 45. A link 46 is journaled at one end in the plate 44 and the forward end of this plate fits into the bifurcation 45. The draw bar 47 is pivotally attached at its forward end to the link 46 again as shown in Figure 14. A pair of rods 48—49 are pivotally attached at their rear end to the axle of the trailer. (This axle is of the usual construction and is not shown.)

The forward end of the rods 48—49 are pivotally attached to the outer ends of a bar 50. This bar is also pivotally mounted on the pin 51 of the link 46. A T-plate 52 is pivotally secured to the rods 48—49 and to the draw bar 47. The front end of the T-plate is bifurcated as shown at 53, to receive the outer end of the idler link 54. The idler link 54 is adapted to be connected to the member 50 or released therefrom by means of the key 55. In one position of the key 55, the link 54 is free and is not actuated as the plate 44 swings from side to side, to follow the movement of the towing vehicle. In the other position of the key 55, this idler link does follow the movement of the plate 44 through the action of the link 46. As the plate 44 moves from side to side, the rods 48—49 will be pulled, thus causing the frame 42 of the trailer to shift on the channel 43. If desired, a caster wheel 56 can be mounted on or below the pin 51 of the link 46.

Having described my invention, I claim:

1. A trailer hitch for securing a trailer to a towing vehicle, comprising a tow bar, means attaching the tow bar at one end to the trailer and the other end to the towing vehicle, a yoke, said yoke being attached at one end to the trailer, means slidably mounting the other end of the yoke on the towing vehicle and means coupling the tow bar and the yoke whereby the forward end of the yoke is caused to move from side to side relative to the tow bar as the towing vehicle is moved from side to side, and means shiftably mounting the forward end of said tow bar on the towing vehicle.

2. A trailer hitch for securing a trailer to a towing vehicle, comprising a tow bar, means attaching the tow bar at one end to the trailer and the other end to the towing vehicle, a yoke, said yoke being attached at one end to the trailer, means slidably mounting the other end of the yoke on the towing vehicle and means coupling the tow bar and the yoke whereby the forward end of the yoke is caused to move from side to side relative to the tow bar as the towing vehicle is moved from side to side, and means shiftably mounting the forward end of said tow bar on the towing vehicle, releasable means engaging the shiftable end of said tow bar and releasable end of said yoke.

3. A trailer hitch for coupling a trailer to a towing vehicle comprising a tow bar, means securing one end of the tow bar to the trailer and means securing the other end of the tow bar to the vehicle, a yoke extending forwardly from the trailer, means shiftably mounting the forward end of the yoke on the vehicle, a rigid bar projecting rearwardly from the vehicle and a crank rod pivotally mounted in the bar and in the tow bar, means securing the outer end of said crank rod to said yoke.

4. A trailer hitch for coupling a trailer to a towing vehicle comprising a tow bar, means securing one end of the tow bar to the trailer and means securing the other end of the tow bar to the vehicle, a yoke extending forwardly from the trailer, means shiftably mounting the forward end of the yoke on the vehicle, a rigid bar projecting rearwardly from the vehicle and a crank rod pivotally mounted in the bar and in the tow bar, means securing the outer end of said crank rod to said yoke, means shiftably mounting the forward end of said tow bar on the vehicle.

5. A trailer hitch for coupling a trailer to a towing vehicle comprising a tow bar, means securing one end of the tow bar to the trailer and means securing the other end of the tow bar to the vehicle, a yoke extending forwardly from the trailer, means shiftably mounting the forward end of the yoke on the vehicle, a rigid bar projecting rearwardly from the vehicle and a crank rod pivotally mounted in the bar and in the tow bar, means securing the outer end of said crank rod to said yoke, and means slidably mounting the rear end of the crank rod in said bar.

6. A trailer hitch for coupling a trailer to a towing vehicle comprising a tow bar, means securing one end of the tow bar to the trailer and means securing the other end of the tow bar to the vehicle, a yoke extending forwardly from the trailer, means shiftably mounting the forward end of the yoke on the vehicle, a rigid bar projecting rearwardly from the vehicle and a crank rod pivotally mounted in the bar and in the tow bar, means securing the outer end of said crank rod to said yoke, means shiftably mounting the forward end of said tow bar on the vehicle, releasable means engaging the forward end of the yoke whereby said yoke is held against horizontal movement and releasable means engaging the forward end of the tow bar whereby tow bar is held against horizontal movement.

7. A trailer hitch for coupling trailers to a towing vehicle comprising a tow bar, means securing one end of the tow bar to the trailer, a yoke projecting forwardly from the trailer, a channel fixedly attached to the vehicle, said channel extending transversely of the vehicle, means shiftably mounting the forward end of the yoke in the channel, a track fixedly mounted adjacent the channel, means shiftably mounting the forward end of the tow bar in said track, a crank arm, a fixed bar projecting rearwardly from the vehicle, said crank arm being pivotally mounted in the fixed bar and in the tow bar and means attaching the forward end of said crank arm to the yoke.

8. A trailer hitch for coupling trailers to a towing vehicle comprising a tow bar, means securing one end of the tow bar to the trailer, a yoke projecting forwardly from the trailer, a channel fixedly attached to the vehicle, said channel extending transversely of the vehicle, means shiftably mounting the forward end of the yoke in the channel, a track fixedly mounted adjacent the channel, means shiftably mounting the forward end of the tow bar in said track, a crank arm, a fixed bar projecting rearwardly from the vehicle, said crank arm being pivotally mounted in the fixed bar and in the tow bar and means attaching the forward end of said crank arm to the yoke, and releasable means engageable with the forward end of said yoke, whereby said yoke is prevented from shifting in the channel and releasable means engageable with the forward end of the tow bar whereby the tow bar is prevented from shifting in said track.

9. A trailer hitch for coupling a trailer to a towing vehicle, comprising a tow bar, means securing one end of the tow bar to the trailer and means securing the other end of the tow bar to the vehicle, a trailer frame means shiftably mounting the forward end of the frame on the vehicle, a rigid bar projecting rearwardly from the vehicle and a crank rod pivotally mounted in the bar and in the tow bar and means securing the other end of said crank rod to said trailer frame.

10. A trailer hitch for coupling a trailer to a towing vehicle, comprising a tow bar, a trailer frame, an axle mounted on the frame and wheels on the axle, means securing one end of the tow bar to the vehicle and means securing the other end of the tow bar to the trailer, means shiftably mounting the forward end of the frame on the vehicle, a rigid bar projecting rearwardly from the vehicle, a pair of spaced rods pivotally attached at one end to the trailer and at the other end to a cross bar, means mounting the cross bar on said rigid bar and crank means pivotally mounted in the rigid bar and attached at one end to said rigid bar and in the other end to said spaced rods.

11. A trailer hitch for coupling a trailer to a towing vehicle, comprising a tow bar, a trailer frame, an axle mounted on the frame and wheels on the axle, means securing one end of the tow bar to the vehicle and means securing the other end of the tow bar to the trailer, means shiftably mounting the forward end of the frame on the vehicle, a rigid bar projecting rearwardly from the vehicle, a pair of spaced rods pivotally attached at one end to the trailer and at the other end to a cross bar, means mounting the cross bar on said rigid bar and crank means pivotally mounted in the rigid bar and attached at one end to said rigid bar and in the other end to said spaced rods, said mounting means on the spaced rods comprising a T-plate pivotally attached to each of the rods and to the tow bar.

WILLIAM E. BUSH.